United States Patent [19]

Barnard

[11] Patent Number: 5,321,994
[45] Date of Patent: Jun. 21, 1994

[54] THROTTLE CONTROL

[75] Inventor: Michael A. Barnard, Wichita, Kans.

[73] Assignee: Wescon Products Company, Wichita, Kans.

[21] Appl. No.: 965,887

[22] Filed: Oct. 23, 1992

[51] Int. Cl.$^5$ ............................................. F16C 1/10
[52] U.S. Cl. .................................. 74/502.2; 56/11.3;
56/10.5; 74/523; 74/535
[58] Field of Search ............... 74/475, 489, 500.5 R,
74/501.5, 501.6, 502.2, 527, 577 R, 577 M, 575;
56/11.3, 10.8

[56] References Cited

U.S. PATENT DOCUMENTS

| | | | |
|---|---|---|---|
| 4,309,862 | 1/1988 | Carlson | 74/527 X |
| 4,428,180 | 1/1984 | Carlson | 56/11.3 |
| 4,438,658 | 3/1984 | Carlson | 74/523 |
| 4,466,308 | 8/1984 | Kester et al. | 56/11.3 |
| 4,503,958 | 3/1985 | Nishio | 74/475 X |
| 4,667,459 | 5/1987 | Scanland et al. | 856/11.3 |
| 4,813,214 | 3/1989 | Barnard et al. | 56/11.3 |
| 4,936,160 | 6/1990 | Barnard et al. | 74/501.6 |

*Primary Examiner*—Vinh T. Luong
*Attorney, Agent, or Firm*—Hovey, Williams, Timmons & Collins

[57] ABSTRACT

A throttle control for connection to an engine throttle control wire broadly includes a shifter and a case, with the shifter including a rim which engages a corresponding bearing wall within the case to define a circular shift path and which enables the throttle control to be converted for either a positive-action or negative-action mode. The case includes a first portion and a second portion, with at least one of the portions preferably including an inner wall spaced radially inwardly toward a pivot axis of the shifter and away from the bearing wall. The inner wall preferably includes one or more recesses thereon for engagement with a follower on the shifter whereby the shifter may be releasably held by the recess at a preselected position along the shift path.

7 Claims, 1 Drawing Sheet

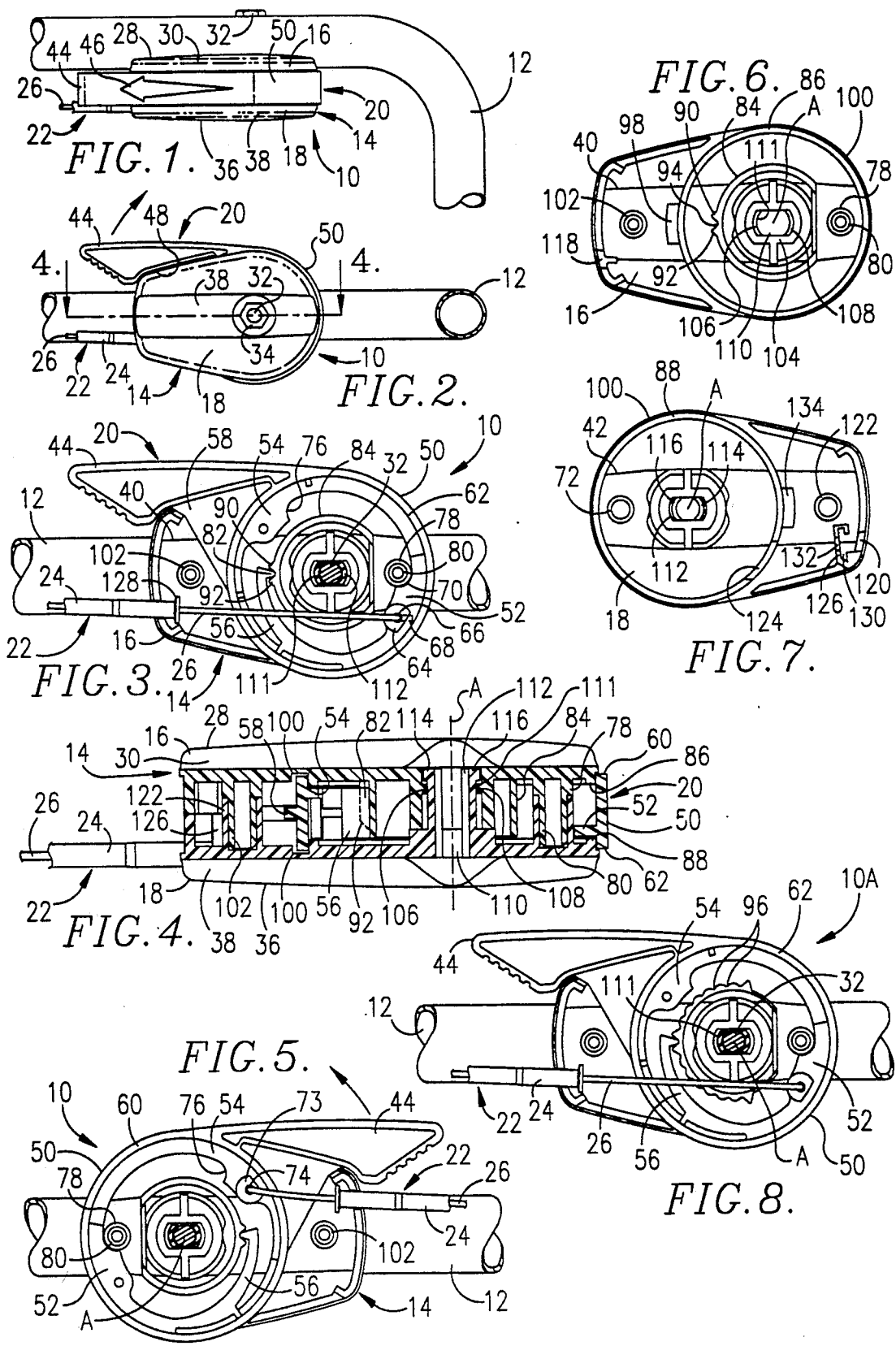

THROTTLE CONTROL

BACKGROUND OF THE INVENTION

1. Field of the Invention

This invention concerns a throttle control for use with equipment having an engine which is adapted for use in either a positive-action or negative-action mode. The throttle control hereof includes a shifter coupled to a control cable and moveable in a circular path, the shifter being reversibly held between the surrounding case for orientation in either a positive-action or negative-action position.

2. Description of the Prior Art

Many types of power implements such as lawn mowers, tillers, and the like are powered by internal combustion engines which are operable at different speeds. Typically a Bowden cable having an outer sheath and an inner control wire are connected between the throttle of the engine and a throttle control mounted on the handle or other handy location. In use, the throttle may be actuated by shifting a lever to move the wire toward and away from the throttle.

In some instances, the orientation of the engine throttle makes it advantageous to have the engine at an open throttle or maximum speed with the control wire extended toward the control (negative-action), and decrease engine speed by pushing the wire away from the control and relatively toward the throttle. In this latter, closed-throttle position, the control lever is, by common practice, in a retracted position, i.e. pulled toward the operator. In other applications, it may be advantageous to have the engine at an open throttle or high speed with the control wire retracted toward the throttle and away from the control (positive-action), where the engine speed is decreased by pulling the control lever toward the operator to draw in the control wire toward the control. Typically, these types of action are independent and require separate designs of controls which must be independently manufactured.

It is also well known in the art to provide throttle controls which pivot. This pivot action is typically accomplished by a central pivot pin about which the shift lever moves in an arcuate path, as illustrated in U.S. Pat. Nos. 4,438,658 to Carlson and 5,000,059 to Barnard. However, in some circumstances a central pivot pin used to both hold the shifter in place and provide a pivot point may make pivoting undesirably difficult.

There has thus developed a need for a simple, economical throttle control which is inexpensive to manufacture, reliable in use, easy to shift, and which may be readily converted for use in either a positive-action or negative-action mode using the same components. Additionally, the shifter should be capable of detent-type action whereby at various points along the range of shifting movement, the throttle control presents preselected stops for holding the shifter against undesired movement which might be caused by vibration of the implement. Further, such a throttle control preferably may be converted between positive-action and negative-action modes before installation on the implement without the need for tools, but which can be partially assembled to prevent unintended disassociation of the components.

3. Summary of the Invention

These needs have been largely met by the throttle control in accordance with the present invention. The throttle control hereof is economical to manufacture and may be molded entirely of synthetic resin such as ABS. It is convertible for use in either a positive-action or negative-action mode. It presents a substantially circular bearing surface for engagement between the shifter and the supporting case which is spaced away from the pivot axis to provide ease in shifting. It also includes a minimum of components which can be releasably connected and separated without the need for tools prior to mounting on the implement.

In greater detail, the present invention includes a shifter and a case presenting first and second mating portions. The shifter is preferably integrally formed and includes a shift lever, a circular rim for defining a circular shift path, a positive-action control wire receiver and a negative-action control wire receiver. The shifter is positioned between first and second portions of the case and held therebetween, the case including a bearing wall which engages with the circular rim of the shifter to present a circular shift path. The bearing wall is spaced outwardly from the pivot axis and the case preferably includes an inner wall adapted to engage a follower provided on the shifter. Preferably the inner wall is provided with one or more recesses therein adapted to receive the follower at preselected points along the circular shift path.

The case and the shifter are configured to enable the shifter to be positioned in either a positive-action or a negative-action mode. The case includes a keeper for holding a mounting flange on the sheath surrounding the control wire, and a gap is provided in the bearing wall of one of the portions of the case to enable the control wire to pass therethrough. The lever of the shifter, which may be oriented at an angle or tangentially to the outer surface of the rim, may be provided with indicia on one side thereof useful in assisting the operator such as an indication of increasing throttle speed. Because the shifter can be reversed for either a positive-action or negative-action mode, the indicia can be presented for viewing by an operator in either mode by reversing the position of the shifter relative to the case. In either mode, the control wire remains in alignment with the gap in the rim, and only the particular positive-action receiver or negative-action receiver is changed.

The throttle control is readily mountable to a handle of the power implement by a single bolt passing through the pivot axis, but the bolt does not affect the force needed to move the shifter through its path of operation. The structure defining the aperture through which the mounting bolt passes also preferably defines a coupling member which includes a male clip associated with one of the portions of the case and a female tubular member presenting an internal catch on the other portion, whereby the coupling member can hold both sections and the shifter therebetween prior to final assembly on the handle of the power implement. The sections can be manually pulled apart without damage and without the need for tools, and then quickly clipped back together after, e.g., attaching the control wire to the desired positive-action or negative-action receiver.

BRIEF DESCRIPTION OF THE DRAWINGS

FIG. 1 is a top plan view of the throttle assembly of the present invention shown mounted to the handle of a power implement;

FIG. 2 is a left side elevation view of the throttle assembly hereof in the negative-action mode;

FIG. 3 is an enlarged, vertical cross-sectional view of the throttle assembly hereof in the negative-action mode showing one portion of the case, the shifter and the control wire;

FIG. 4 is an enlarged, horizontal cross-sectional view taken along line 4—4 of FIG. 2 showing the shifter held between the mating portions of the case;

FIG. 5 is an enlarged, vertical cross-sectional view similar to FIG. 3 but showing the shifter oriented and connected to the control wire in the positive-action mode;

FIG. 6 is an enlarged fragmentary vertical cross-sectional view of the case showing a first portion of the case presenting an inner wall having a recess for engaging a follower on the shifter and a female tubular member for coupling to a second portion of the case;

FIG. 7 is an enlarged fragmentary vertical cross-sectional view of the case showing a second, opposed portion of the case presenting a male clip member for coupling to the first portion; and FIG. 8 is an enlarged vertical cross-sectional view of similar to FIG. 3 but showing an alternate embodiment of the first portion of the case having an inner wall configuration presenting a plurality of recesses.

DESCRIPTION OF THE PREFERRED EMBODIMENT

Referring now to the drawing, a throttle control 10 in accordance with the present invention is adapted for mounting to a handle 12 of a power implement having an internal combustible engine. The throttle control 10 broadly includes a case 14 including a first portion 16 and a second portion 18 which, when coupled together, hold therebetween a shifter 20. The throttle control 10 is connected to a control cable 22 which includes an outer sheath 24 and an inner control wire 26.

In greater detail, the case 14 is adapted for mounting to the handle 12 in such a manner that either the first portion 16 or the second portion 18 may be juxtaposed to the handle 12. For example, first portion 16 includes an outer surface 28 presenting an elongated groove 30 therein which is shown in phantom in FIG. 1. A mounting bolt 32 may be inserted through a suitable hole extending diametrically through the handle 12 and through the case 14 as shown in FIG. 3, the bolt 32 being coincident with a central pivot axis A. The throttle control 10 is then held in place by nut 34 or other fastener threadable secured to bolt 32. The groove 30 helps to hold the throttle control 10 in tight conformity to the handle and inhibit undesired pivotal movement about the bolt 32. Similarly, second portion 18 also presents an outer surface 36 presenting an elongated groove 38 therein which may be mounted in juxtaposition to the opposite side of the handle 12 in the same manner, with the groove 38 similarly inhibiting undesired pivotal movement. The location of the groove 30 is evidenced by the raised ridge 40 presented along the interior of the first portion as shown in FIGS. 3, 5, 6 and 8, while the location of the groove 38 is evidenced by the raised ridge 42 of the second portion 18 shown in FIG. 7.

The shifter 20 includes a control lever 44 which is preferably provided with indicia 46 on the surface normally visible to the implement operator. The indicia 46 preferably indicates the direction of throttle or engine speed increase to aid the operator in use of the implement. As may be seen from the drawing, the lever 44 is configured to rest with an opposite surface 48 against the outer surface of the first portion 16 and second portion 18 when the engine is operating in the slow, stop or idle position. The arrow in FIG. 2 illustrates generally the direction the shift lever 44 moves to decrease throttle speed.

The shifter 20 further includes a substantially circular rim 50, a negative action receiver 52, a positive action receiver 54, and a follower 56. The shifter 20 is preferably integrally molded of a synthetic resin material such as ABS. Rim 50 is preferably of the width of the shift lever 44 as shown in FIG. 1. A gusset 58 provides reinforcement between the shift lever 44 and the rim 50. Rim 50 further presents a first margin 60 and a second, opposed margin 62.

Negative action receiver 52 extends radially inward from rim 50 and is positioned more approximate to second margin 62 than first margin 60. Nonetheless, negative action receiver 52 is not co-extensive with second margin 62. Similarly, positive action receiver 54 is positioned more proximate to first margin 60 but is not co-extensive therewith. Negative action receiver 52 includes a boss 64 presenting the hole 66 therein for receiving, in one orientation, proximate end 68 of control wire 26 therethrough. Negative action receiver 52 also includes a maximum-throttle shift limit nook 70 for engaging a corresponding pin receiver 72 extending orthogonally from the raised ridge 42.

Positive action receiver 54 includes a boss 73 presenting a hole 74 therethrough for receiving proximate end 68 of control wire 26 when the shifter is reversed into positive-action orientation as shown in FIG. 5. Positive action receiver 54 further defines a minimum-throttle shift limit nook 76 thereon which is oriented to engage ridge 78 of locating pin 80 when the shifter 20 is rotated to the minimum throttle closed position. The nooks 70 and 76 serve to limit the minimum and maximum positions of throttle opening for the shifter regardless of whether the shifter is oriented in the negative-action position shown in FIG. 3 or the positive-action position shown in FIG. 5.

Follower 56 is provided with an inwardly extending tip 82 for engaging inner wall 84 of first portion 16. Inner wall 84 is spaced radially inwardly from bearing wall 86 which, together with opposing bearing wall 88 on second portion 18, engage rim 50 and serve to define the circular path of travel of the shifter 20. Inner wall 84 is spaced radially outwardly from axis of rotation A of the shifter 20 but radially inwardly from bearing walls 86 and 88. Inner wall 84 preferably includes nibs 90 and 92 which present therebetween a recess 94 for receiving tip 82 of follower 56. The remainder of inner wall 84 may be substantially smooth for easy shifting as shown in FIGS. 3, 5 and 6, are alternatively provided with a plurality of intermediate recesses 96 as shown in the alternate embodiment 10A of FIG. 8.

First portion 16 additionally includes a relieved area 98 in raised ridge 40 for permitting free shifting of shifter 20 along a generally circular path exterior to bearing wall 86. A raceway 100 best seen in FIG. 4 surrounds bearing walls 86 and 88 and receives rim 50 for movement therealong. A second locating pin 102 extends orthogonally inward into the interior of case 14 from raised ridge 40. A tubular receptacle 104 surrounds axis A and includes a pair of ears 106 and 108 which extend into the central aperture 110 to present a catch 111 adapted to receive a corresponding male projection or clip 112 which includes prongs 114 and 116. Finally, first portion 16 also includes a leg 118 which extends into a corresponding notch 120 in second portion to hold the sheath 24 of cable 22 therebetween.

Second portion 18 includes receiver 72 and second receiver 122 for receiving locating pin 102 therein. Bearing wall 88 is substantially circular but includes a gap 124 therein for enabling control wire 26 to pass therethrough for coupling with the shifter 20. Located in alignment with intermediate notch 120 and gap 124 is keeper 126 for receiving and holding therein mounting flange 128 on sheath 24 of cable 22. Keeper 126 includes a slot 130 for receiving mounting flange 128 therein and a crease 132 for allowing control wire 26 to pass thereby but retain mounting flange 128 within slot 130.

Second portion 18 also includes male projection or clip 112 including prongs 114 and 116. A relieved area 134 is provided in raised ridge 42 similar to relieve area 98. As may be seen from FIG. 4, shifter 20 is retained between first portion 16 and second portion 18 whereby rim 50 is retained within substantially circular raceway 100 for shifting movement therealong.

In operation, the throttle control 10 is mounted to handle 12 by inserting the bolt 32 through a suitable hole in the handle 12 and thence through the central aperture 110 of the throttle control 10. The control wire 26 may initially be connected for negative action as shown in FIG. 3 whereby movement of the shift lever 44 and the direction of the arrow shown in FIG. 2 will cause the hole 66 to move in a clockwise direction and move the control wire 26 toward the throttle relative to the control 10. As the control wire 26 moves through the sheath 24, the throttle on the engine will be closed and the speed of the motor decreased. If the throttle control 10A as shown in FIG. 8 is employed, then rotation of the shift lever in a clockwise direction will be resisted by engagement of the follower 56 and a series of recesses 96, thereby presenting discrete throttle positions.

The same throttle control 10 can be employed for positive action when mounted as shown in FIG. 5. When mounted as shown in FIG. 5, the throttle control 10 would be mounted on the opposite side of the U-shaped handle 12 so that the control wire 26 remained oriented toward the throttle. However, while the same components are used in both the positive action and negative action positions, the position of the shifter 20 relative to the first portion 16 is changed. More particularly, the shifter 20 is effectively reversed such that margin 62 is positioned adjacent first portion 16, which is to be contrasted with the negative-action mode shown in FIG. 3 wherein the margin 60 is positioned adjacent first portion 16. In the positive-action mode shown in FIG. 5, movement of the shift lever 44 in a counterclockwise direction as indicated by the arrow pulls the control wire 26 relatively away from the throttle and into the throttle control 10. In this manner, the control wire 26 moves relative to sheath 24 and serves to close the throttle of the engine. It may also be appreciated that, just as in the negative-action mode shown in FIGS. 1 and 3, the indicia 46 remains oriented such that pulling the shift lever 44 toward the user (and away from the engine) effects closing of the throttle.

It may further be appreciated that the throttle control 10 may remain stored for use in either a positive-action or negative-action position, and if not mounted on the implement, may be readily converted to the alternate mode by simply pulling the first and second portions of the case 14 apart and turning the shifter 20 over so the shift lever remains oriented in the same, essentially forward direction but the opposite margin of the rim 50 is positioned adjacent the respective portion of the case.

I claim:

1. A throttle control for use with and attachment to a control wire connected to a throttle of an engine, said control comprising:

a shifter including a control lever, a substantially circular rim for defining a circular shift path around and radially spaced form a central pivot axis, a positive-action control wire receiver, and a negative-action control wire receiver for alternate connection to the control wire; and a case including a first portion and a second portion for holding said shifter therebetween, at least one of said portions including a substantially circular bearing wall spaced radially from said central pivot axis for engagement with said rim for defining said circular shift path, said case including an inner wall on at least one of said portions and spaced radially outwardly from said central pivot axis, said shifter presenting a follower oriented radially inwardly from said rim, said inner wall presenting at least one recess thereon for releasably retaining said follower of said shifter therein against undesired shifting.

2. A throttle control as set forth in claim 1, said inner wall presenting a plurality of recesses thereon for releasably retaining said follower of said shifter against undesired shifting.

3. A throttle control as set forth in claim 1, including means for releasably coupling said case for holding said shifter between said first portion and said second portion, said coupling means including a clip and a catch integrally formed with respective portions of said case.

4. A throttle control as set forth in claim 1, said case including structure defining a keeper for holding a mounting flange on a sheath surrounding the control wire therein.

5. A throttle control as set forth in claim 4, wherein said bearing wall includes therein a gap aligned with said keeper for permitting passage of the control wire therethrough when the control wire is coupled to either said positive-action control wire receiver or said negative-action control wire receiver.

6. A throttle control as set forth in claim 5, wherein said shifter is configured for pivoting within said case about said central pivot axis when either the positive-action control wire receiver or the negative-action control wire receiver is aligned with said gap.

7. A throttle control as set forth in claim 1, including a follower for engagement with a surface on said case, wherein said follower is integrally formed with said bearing wall, said negative-action control wire receiver, said positive-action control wire receiver, and said control lever.

* * * * *